Dec. 14, 1965  S. L. QUICK  3,223,358
TETHERED HELICOPTER
Filed March 18, 1964  6 Sheets-Sheet 1
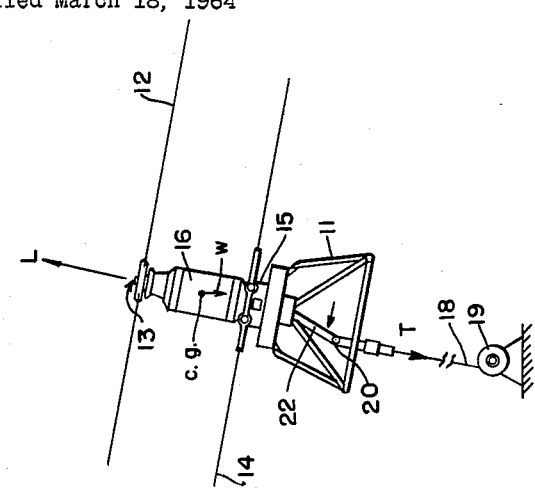
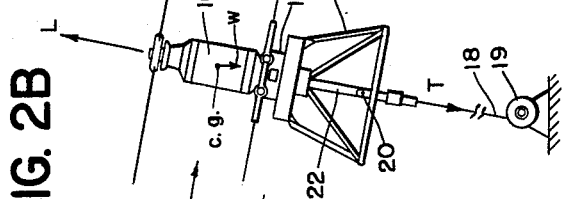
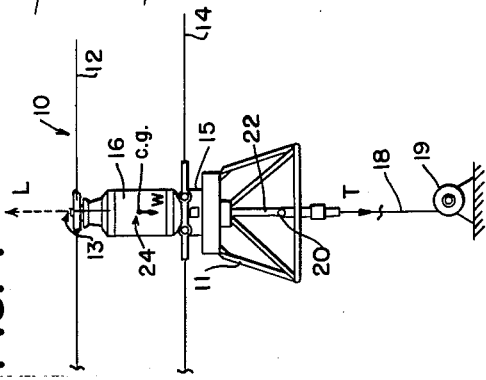
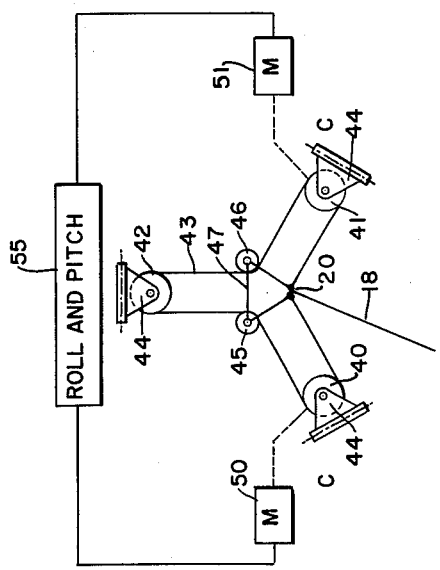
INVENTOR.
STANLEY L. QUICK
BY Darby & Darby
ATTORNEYS Dec. 14, 1965 S. L. QUICK 3,223,358
TETHERED HELICOPTER
Filed March 18, 1964 6 Sheets-Sheet 2

INVENTOR.
STANLEY L. QUICK
BY Darby & Darby
ATTORNEYS

Dec. 14, 1965  S. L. QUICK  3,223,358
TETHERED HELICOPTER
Filed March 18, 1964

INVENTOR.
STANLEY L. QUICK
BY Darby & Darby
ATTORNEYS

United States Patent Office
3,223,358
Patented Dec. 14, 1965

3,223,358
TETHERED HELICOPTER
Stanley L. Quick, Annapolis, Md., assignor to Fairchild Hiller Corporation, a corporation of Maryland
Filed Mar. 18, 1964, Ser. No. 352,737
18 Claims. (Cl. 244—17.17)

This invention relates to helicopters and more particularly to a control system for obtaining orientation stability for a tethered helicopter.

There are several applications in which it is desirable to utilize an unmanned helicopter which is tethered to remain above a fixed point on the ground or a relatively slowly moving base station. One such application is where the unmanned helicopter is to be kept aloft for a long period of time to support a radio antenna which is to be kept as nearly vertical as possible with respect to the base station. Other applications are where the helicopter is to be used as a platform for television or photographic surveillance equipment, astronomical equipment, etc.

As is known, any aircraft is subject to changes in environmental flying conditions which tend to make it unstable with respect to a predetermined orientational frame of reference. Therefore, where an unmanned tethered helicopter is utilized and it is desired to keep the helicopter flying in some predetermined manner, an arrangement must be provided for automatically compensating its orientational attitude to take care of any change in flying conditions such as would be normally brought about by gusts of wind, airpockets, etc. An automatic flight compensating arrangement for a tethered helicopter is desirably made as simple as possible so that it does not greatly add to the cost or complexity of the helicopter base station or to the weight or complexity of the helicopter itself, thereby detracting from the helicopter's performance characteristics.

In the case of an untethered helicopter, flight stabilization is usually provided by collective and cyclic rotor blade pitch controls which may be either manually or automatically operated. When such controls are utilized the control system and rotor construction become somewhat complicated. While orientation stability can be accomplished by collective and cyclic pitch controls in a free flight helicopter, the control arrangement is relatively complex and hence it is impractical for use in an unmanned tethered helicopter whose main construction objective is to be made as simple as possible. Also, since the rotors are vital parts of a helicopter it is desirable to make them as rugged as possible. This is especially true in an unmanned tethered vehicle which is to be kept aloft for long periods of time. The elimination of collective and cyclic pitch controls is a constructive step in this direction since these controls necessitate special rotor structures which tend to make the rotors require maintenance and give rise to a source of rotor failure.

In several forms of unmanned tethered helicopters heretofore known in the art, attitude control of the vehicle has been achieved by providing three or more control lines which are fixed to the earth's surface and spaced substantially equiangularly thereon and around a control hub on the helicopter. Control of the various forces acting on the helicopter is achieved in this arrangement by shortening or lengthening one or more of the control lines. As should be apparent, a control arrangement of this type is relatively complicated since it is difficult to coordinate the operation of the plurality of control lines. This arrangement also requires three or more relatively stationary points for the control lines, thereby preventing the use of the tethered helicopter over water under normal operating conditions. Because of these and other disadvantages of the plural control line system it becomes desirable to obtain attitude control of a tethered helicopter in an arrangement using only a single cable which is connected to only one point of the vehicle.

Several types of helicopters which are tethered by a single cable have already been proposed. In one such type the tether cable length and angle with respect to the horizontal is measured to provide control signals. These signals are then used to control the collective and/or cyclic pitch of the vehicle to achieve the desired flight attitude. However, as pointed out above, attitude control by cyclic and/or collective pitch requires a relatively complex control system and rotor structure and is therefore desirably avoided.

In another arrangement, for example as shown in Platt Patent 2,453,857, attitude control of a tethered helicopter is obtained with a single cable by providing a bridle on the helicopter for shifting the cable tethering point in a predetermined manner, as determined by the shape of the bridle. While the control arrangement in this patent is relatively simple it does not achieve the desired attitude stability for the vehicle since the tethering point, and hence the forces on the helicopter, shift at will in accordance with variations in flight attitude of the vehicle.

In accordance with the present invention an unmanned helicopter is provided which is tethered by a single cable. The flight of the helicopter is controlled to achieve stability above a base station by controllably shifting the tether point of the cable. In order to accomplish this, the helicopter is provided with instruments to sense its attitude with respect to a reference and the signals generated by these instruments are used to shift the effective tether point of the cable. The shifting of the tether point is controlled to produce forces on the vehicle which tend to keep it at the desired orientational flight attitude. All of this is accomplished by using only a single cable and without the use of either cyclic or collective pitch control. Therefore, this arrangement overcomes the disadvantages of the prior art and provides an unmanned tethered helicopter which is simple in construction, has a relatively simple flight stability control system, and needs only a single cable for tethering.

It is therefore an object of this invention to provide an unmanned helicopter which is tethered by a single cable.

Still a further object of the invention is to provide an unmanned tethered helicopter in which the tethering point is controllably shifted in response to variations in flight attitude of the helicopter.

Yet another object of the invention is to provide a tethered helicopter in which the tethering point is shifted by a controllably operated bridle arrangement.

A further object of the invention is to provide a helicopter which is stabilized by force moments generated by the controlled motion of the tether point on the helicopter fuselage.

A further object of the invention is to provide an unmanned helicopter tethered by the single cable in which the tethering point is controllably shifted by driven means which are operated in response to the attitude of the helicopter with respect to a frame of reference.

Other objects and advantages of the present invention will become more apparent upon reference to the following specification and annexed drawings in which:

FIGURES 1 through 3 are schematic representations depicting certain principles of operation of the present invention;

FIGURE 4 is one embodiment of a controllably driven tethering point bridle made in accordance with the present invention;

Figure 5:
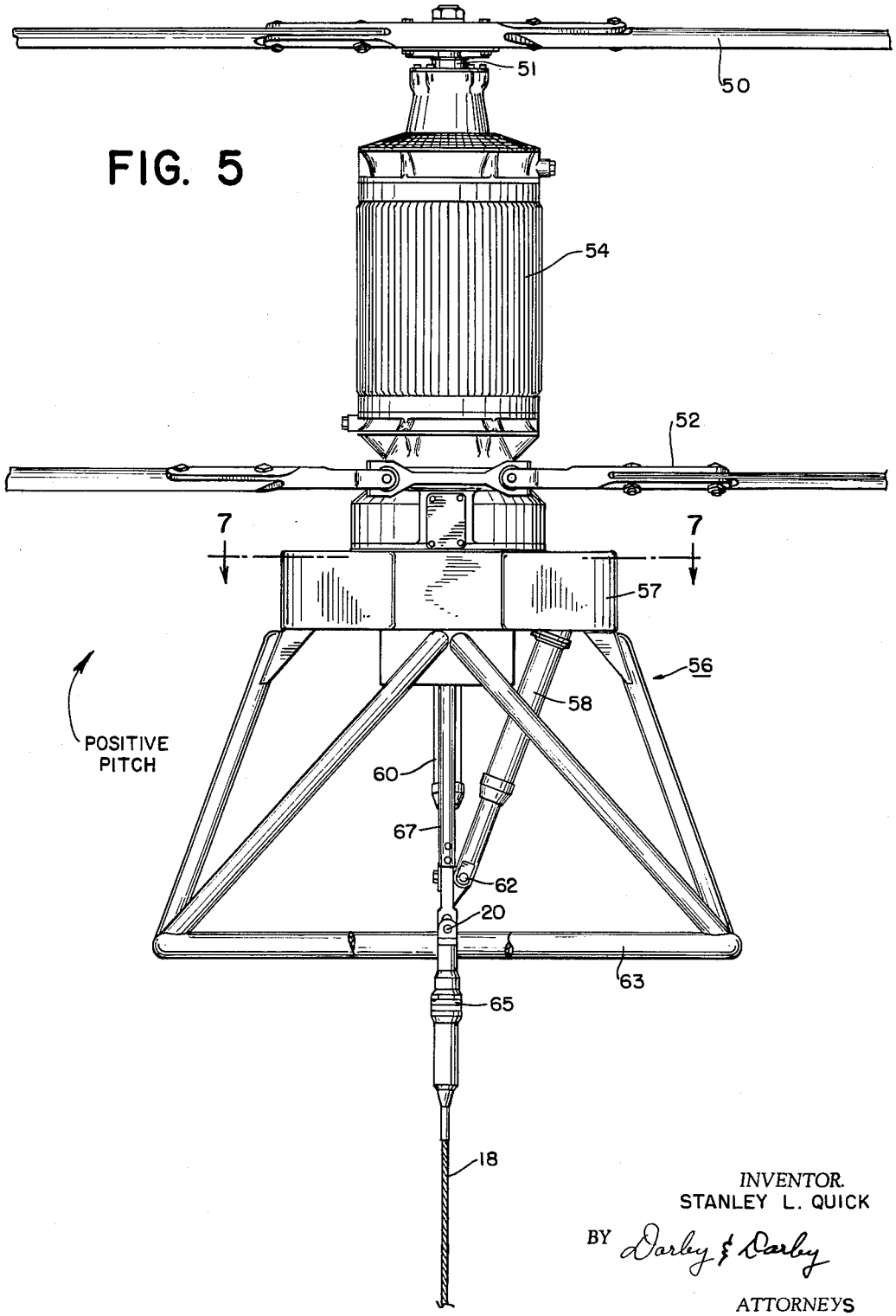
FIGURE 5 is an elevational view of one form of helicopter constructed in accordance with the present invention.

Referring to FIGURE 1 the helicopter vehicle 10 with a frame or fuselage 11 is schematically shown as being of the coaxial rotor type having upper and lower rotor blades 12 and 14 mounted on respective counter-rotating rotor shafts 13 and 15. In accordance with the present invention these rotor blades are of relatively simple construction since neither collective nor cyclic pitch control is provided.

The drive means for the rotor blades 12 and 14 is provided by a motor 16, mounted on the frame 11. Motor 16 is preferably an electric motor which receives its power from the base station through a cable 18, which is the same cable used to tether the vehicle. The tethering cable 18 is fed from a winch 19 located on the ground or base station and it is attached to the helicopter 10 at point 20 which is located on the end of a universally movable arm 22. The arm 22 is controllably driven by a suitable mechanism (not shown) on the helicopter. The center of gravity 24 of the helicopter is shown as being at a point above the lower rotor blade 14 and on the axis of the coaxial rotors. Of course, the center of gravity is determined in accordance with the design of the vehicle.

The helicopter 10 may use any of the well known constructional principles for its rotor blades. For example, the blades may be counter-rotating. Also, the upper and lower rotor blades may be of the same or different sizes and may be rotating at the same or different speeds depending upon their respective sizes. Where a speed difference is used between the two rotor blades a reduction gearing system may be provided between the drive motor 16 and the particular rotor. It is known that coaxial rotor type helicopters have several advantages in that the drive torques of the rotors balance one another, the vehicle configuration is compact, and maneuverability is good.

When rotor blades 12 and 14 are provided with a sufficient amount of torque by the motor 16, a lift force is produced. This is shown by the vector L. If only this lifting force and the helicopter weight W are present and if the helicopter's altitude is controlled by the length of cable 18 played out from the winch 19, then a force component of tension is produced along the cable through the center of gravity 24. This latter force is in a direction opposite to that of the lift force L, and is shown by the vector T. The magnitude of T is equal to the difference between L and W.

When the helicopter rotor axis is substantially vertical with respect to the base station or ground and there are no other forces affecting the flight attitude of the vehicle, the helicopter will be constrained to vertical motion. The motion will be up or down depending upon the amount of lift force available and the length of cable 18. The desired flight mode for the vehicle is in the vertical direction so that the helicopter always has its rotor axis substantially vertical above the base station. Of course, the base station may be a moving object, such as a ship, which will move the helicopter along with it.

Under some flight conditions the vehicle 10 experiences forces which will change its roll or pitch attitude from level flight and tend to move it from the normal position above the ground or base station. This is shown in FIGURE 2A, where the wind, represented by the vector 25, hits the helicopter and tilts the rotor plane in the direction shown. When the rotors are tilted and if the point of cable attachment 20 is of the universal or swivel type, the cable 18 will remain substantially vertical for the first instant. This is shown by the "first position" representation of FIGURE 2A. When this occurs the lift vector L now has a horizontal component $L_h$ and a vertical component $L_v$. The horizontal component $L_h$ now present tends to move the vehicle 10 in the direction shown by vector $L_h$. The motion of the vehicle brought about by the $L_h$ vector moves the cable 18 in the same direction the vehicle is travelling, as is shown by the "second position" representation of FIGURE 2B. Here, the cable 18 is inclined at an angle to the vertical. With the cable inclined as shown in FIGURE 2B, the vehicle cannot automatically reassume the position wherein the rotor axis is substantially vertical (FIGURE 1) when the wind or other disturbing force 25 ceases. This is so because the weight vector W tends to increase the deflection of the cable from the vertical. In order to return the vehicle to the position of FIGURE 1, a restoring force must be deliberately applied. The horizontal component $L_h$ tends to move the vehicle 10 in the direction shown by vector $L_h$.

To deliberately provide the needed restoring force, the tethering point 20 of the cable 18 is shifted away from its previous position on the axis of the rotors. This is shown in FIGURE 3 where the universally movable arm 22 has been moved from its original position in FIGURES 1 and 2. Now, since the tethering point 20 is offset from the rotor axis, and assuming that the length of cable 18 is kept constant, the tension force vector T produces a force moment acting around the center of gravity 24. This force moment acts to rotate the vehicle 10 in the direction to tilt the lift vector to a vertical position and thus to counter-balance the effect of the vehicle weight and restore the vehicle to its original condition wherein the rotor axis is substantially vertical above the base station. It should be understood that the correction force moment applied to the vehicle by shifting the tethering point 20 can be made to act in either the roll or pitch attitudes or in any combination thereof. To state it another way, the tethering point 20 is shiftable with respect to either or both of the transverse major axes (roll and pitch) of the helicopter at any time a correction is being applied.

In accordance with the present invention the tethering point 20 is controllably shifted by self-contained means on the helicopter to produce the restoring force moments needed to maintain the helicopter in a predetermined position and in level flight attitude above the base station. To accomplish this the vehicle 10 has gyros or other similar devices for sensing deviation in roll and pitch attitude from a reference plane which is preferably horizontal. Upon sensing deviation in either roll or pitch, control signals are produced by the gyros which are used to operate driving devices to shift the tether point 20. In FIGURES 1–3 this is done by moving the arm 22. The attitude sensing devices used in the present invention are well known in the art and they, in themselves, form no part of the present invention. Therefore no further description of these devices is believed necessary.

FIGURE 4 shows a bottom view of a driven bridle arrangement of controllably shifting the tether point in accordance with the signals produced corresponding to the deviation of the vehicle from the reference plane. This arrangement is different from the universally movable arm 22 of FIGURES 1–3. Here, three pulleys 40, 41 and 42 on a bridle frame (not shown) are attached to the vehicle fuselage 11. The pulleys are mounted on hinges 44 at points located on a circle concentric with the rotor axis and spaced equiangularly therearound. The bridle is formed by a single continuous line 43 threaded through each of the pulleys 40, 41 and 42 and fixedly attached to the tethering point 20 and the tethering cable 18. The stationary hubs of two idler pulleys 45 and 46 are connected together by a framework 47 which is in turn attached to the tethering point 20. The idler pulleys 45 and 46 are free to move along the line 43. Movement of the attachment point 20 moves the harness formed by idler pulleys 45 and 46 and framework 47 along the continuous bridle line 43. The two pulleys 40 and 41 are preferably made free wheeling so that the bridle adjusts itself to any average direction of change of the tether force T.

With the bridle adjusted for normal flight operation in the reference plane and there being no attitude correcting force applied, the tension force T along the line 18 acts approximately through the center of gravity of the vehicle, which is normally on the rotor axis line. Thus the bridle produces a kinematic effect as if the cable 18 were attached at the vehicle center of gravity. While this direct attachment to the center of gravity is normally difficult to achieve in practice, the desired correcting forces can still be obtained by shifting the tethering point which may be offset from the center of gravity.

In order to shift the tethering point 20 away from its equilibrium position the pulleys 40 and 41 are driven by the servo motors 50 and 51. These servo motors are operated in response to control signals developed by roll and pitch sensing apparatus 55 mounted on the vehicle. This apparatus senses roll and pitch deviations of the vehicle with respect to a level normal flight condition of the rotor axis vertical above the base station. The control signals produced by the sensing apparatus 55 actuate motors 50 and 51 through a servo system to drive the bridle cable 43. When signals are applied to the motors 50 and 51 a differential tension is inserted into the legs of the bridle so that the tether point 20 is moved off its natural equilibrium position. The magnitude and direction of the movement of point 20 is controlled so that the tension force T acting along the cable 18 provides a restoring control moment about the vehicle center of gravity which will restore the vehicle to its normal flight attitude. The use of two controlled pulleys permits complete displacement coverage for the tether point 20 over a fairly large region which will correct for attitude errors in both pitch and roll or combinations thereof. This bridle arrangement is the equilavent of using the universally movable arm 22 of FIGURES 1–3.

FIGURE 5 shows a preferred embodiment of a tethered helicopter made according to the present invention using a mechanical linkage instead of a bridle to shift the tether point. In this embodiment counter-rotating rotors 50 and 52 are driven by a motor 54 which is preferably of the electric type having a rotor which turns in one direction and an outer casing which turns in the other direction. The motor rotor drives a shaft 51 to rotate upper rotor 50 in one direction while the motor outer casing 54 drives the lower rotor 52 in the opposite direction as it rotates on a bearing 53 (see FIGURE 6). Thus, the rotor driving torques are exactly balanced. As can be seen, the rotors are of simple, fixed construction and do not have the articulated blades normally associated with cyclic or collective pitch control.

The motor 54 is mounted to a housing 57 which has a fuselage 56 attached thereto. The flight attitude sensing devices and a portion of the tether point shifting drive mechanism are located within the housing. Universally connected to and suspended from the housing 57 are two variable length actuator arms 58 and 60 whose driven upper ends are spaced preferably approximately 90° to 120° apart. The lower ends of the arms come together and are connected to a universal joint 62 located in the approximate center of the fuselage and spaced from the fuselage bottom rails 63. The exact distance of the universal joint 62 from the motor and other parts of the vehicle is dependent upon the location of the helicopter's center of gravity.

Figure 6:
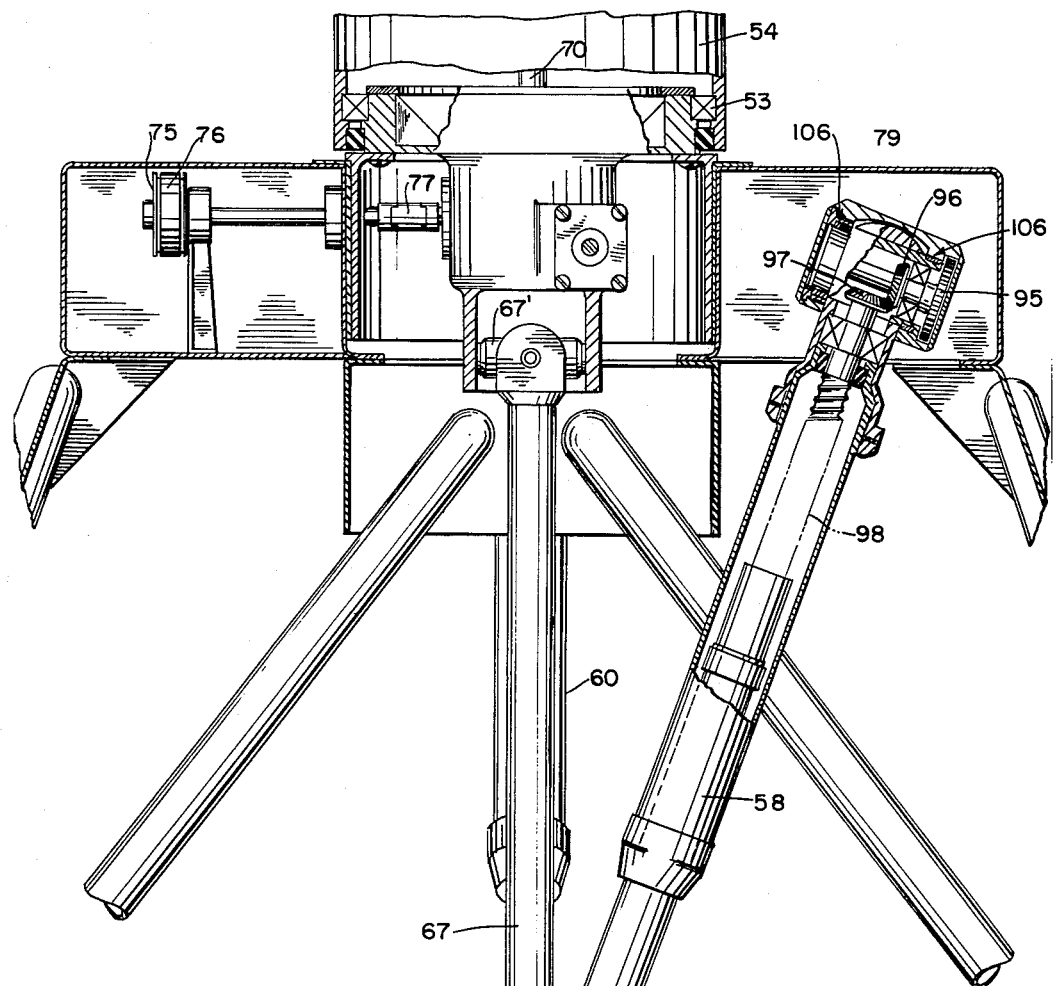
FIGURE 6 is a view of a portion of the helicopter of FIGURE 5 showing the mechanism for shifting the tethering point.

A connection is made between the tether cable 18 and the tether point 20 by a coupling member or connector 65. The tethering point 20 for the end of the cable is below and attached to the joint 62 and is mounted for universal movement. The tether cable preferably carries electrical energy from the base station to operate the motor so it has inner conductors (not shown) for the purpose. The cable also has an outer cover of metal or other similarly strong material to provide the strength needed to handle the various forces acting on the cable. As pointed out before, the cable is reeled in and out by a winch or other suitable apparatus (not shown) located at the base station. Connections are made to the motor from the cable inner conductors through a tubular member 67 which extends upwardly from the universal joint into the motor housing area. Member 67 is pivotally mounted at its upper end at 67' (FIGURE 6). The motor is provided with slip rings or other arrangement for utilizing the current from the base station.

In operation the lengths of the actuator arms 58 and 60 are varied in accordance with the attitude of the helicopter with respect to a reference plane to shift the effective tethering point of the cable with respect to either or both of the transverse major axes of the vehicle and thereby tilt the vehicle in accordance with the new force moments produced by the shift of the tether point with respect to the vehicle center of gravity. This shifting is controlled to produce force moments which will restore the helicopter to a position with the cable 18 substantially vertical above the base station.

Figure 7:
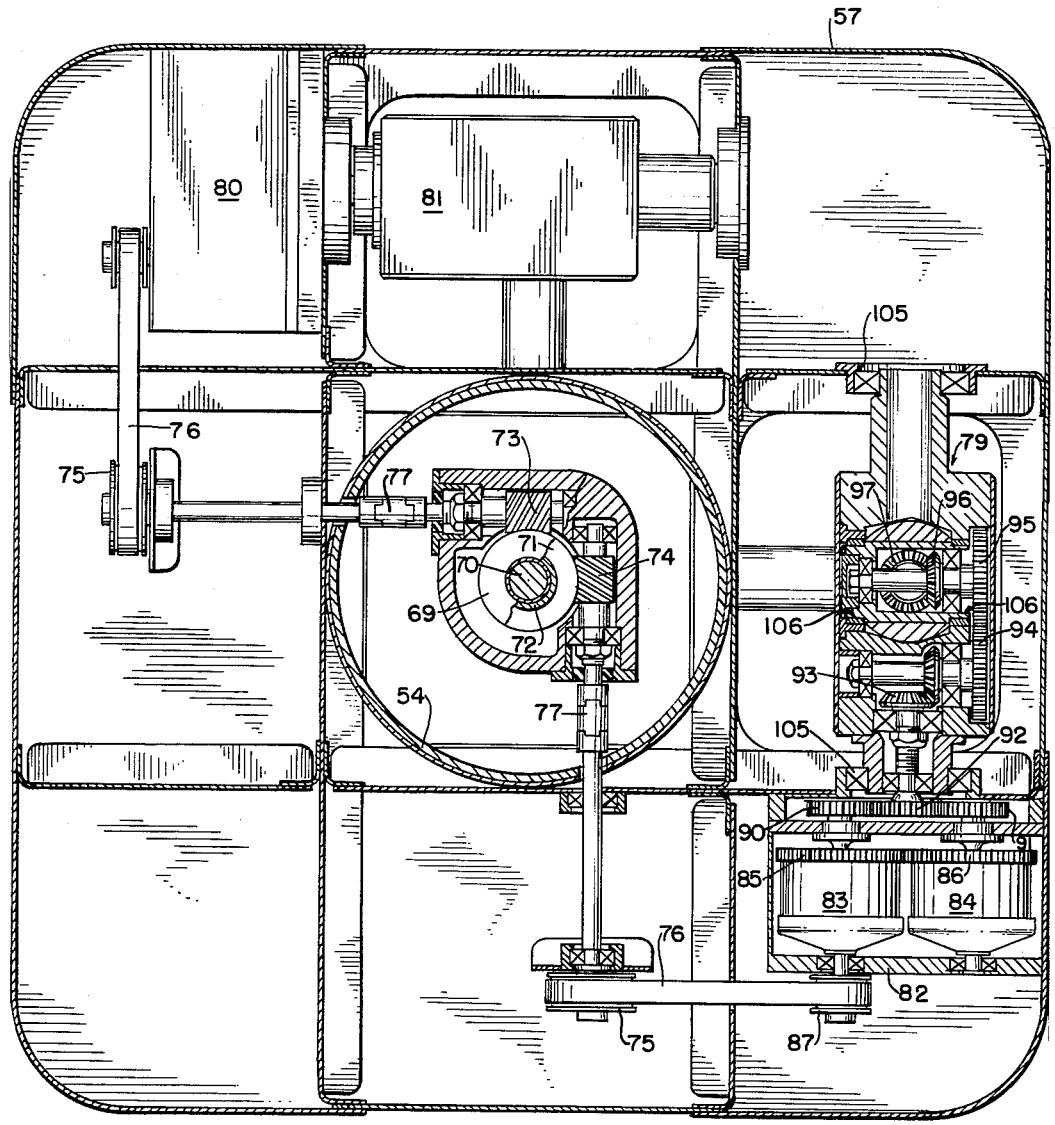
FIGURE 7 is a section of the fuselage taken along line 7—7 of FIGURE 5 and showing the control arm drive mechanism.

FIGURES 6 and 7 are detailed views of the actuator arms and the drive control mechanism therefor. The motor 54 turns two counter-rotating drive shafts 70 and 72. These shafts carry helical drive gears 69 and 71 which drive respective helical gears 73 and 74. Each of the gears 73 and 74 drives a respective pulley 75 and belt 76 through a coupling member 77 to apply power to respective clutch assemblies 80 and 82 and drive mechanisms 79 and 81. The clutch assembly 82 controls the length of actuator arm 58. Since the two clutch assemblies and actuator control mechanisms are of similar construction only one of each is described, this being assembly 82 and drive mechanism 79.

The clutch assembly 82 preferably has two clutches 83 and 84 which are of the magnetic type. In this type of clutch the amount of clutch engagement and output torque is varied by control or bias signals which orient magnetic particles or other similar material in the clutch. These control signals are supplied from the attitude sensing devices located in the housing 57, as will be described. Each of the clutches 83 and 84 has a freely rotatable outer housing with mating ring gears 85 and 86 mounted thereon. Clutch 83 is supplied with input power from the belt 76 through a drive pulley 87 and as its outer housing rotates, it also rotates the outer housing of clutch 84 in the opposite direction through the ring gears 85 and 86. Each of the clutches also has a respective output gear 90 and 91 which rotates and produces output torque depending upon the energization of the respective clutch. Turning either of output gears 90 or 91 causes a central drive gear 92 to rotate in the opposite direction. This provides two way rotation to the drive gear 92 for driving the mechanism to lengthen or shorten the actuator arm 58 in accordance with the direction of drive gear rotation. This type of clutch drive mechanism is well known.

The drive gear 92 moves a set of bevel gears 93 which in turn drives two mating spur gears 94 and 95. The output spur gear 95 is mounted on a shaft which turns a bevel gear 96. Bevel gear 96 in turn drives a second bevel gear 97 at the input end of the threaded arm of a conventional ball and nut mechanism 98 in the actuator arm 58. Depending upon the direction of rotation of the input drive gear 92, as determined by attitude control signals, the ball and nut mechanism 98 is moved and the length of the actuator arm 58 is either lengthened or shortened according to the direction of the movement. It should be understood that the actuator arm 60 is moved in the same manner by the clutch assembly 80 and a drive mechanism 81 similar to that described above.

As shown in FIGURE 7, the upper ends of the actuator arms have their respective drive mechanisms 79 and 81 universally mounted to the fuselage. This is accomplished by the bearings 105 and 106 which are shown for the drive mechanism 79. A similar set of bearings is provided for drive mechanism 81.

The lower end of actuator arm 58 is mounted on a universal joint 108 which includes a spherical bearing 109. A similar universal joint mounting arrangement is provided for the lower end of actuator arm 60. The two universal mounting joints 108 form the universal joint 62 which permits the lower ends of the arms to move as their lengths are varied.

The tether point 20 is connected at another universal joint 102 which may be, for example, of the cardan type. This permits the cable 18 to assume any angle as the helicopter moves from a position above the base station or the location of the tether point 20 is changed.

As can be seen, lengthening or shortening either of the arms 58 or 60 changes the location of the joint 62 with respect to the helicopter fuselage. This also shifts the location of the tether point 20 with the end of cable 18 moving in joint 102 accordingly. If the cable 18 is kept under tension by the lift force supplied by the rotors, the shifting of the tether point 20 changes the force moment produced by the tension of cable 18.

If, for example, the movement of actuator arm 58 is to compensate for deviations in roll attitude from a predetermined reference plane and the movement of arm 60 to compensate for deviations in pitch attitude, then the force moments needed to restore the vehicle to its reference plane can be readily produced by varying the lengths of the arms, either singly or at the same time, in the proper direction and in the correct amount. This is done by providing control signals to the clutch assemblies 80 and 82 in accordance with the deviation of the vehicle from its reference plane and using these control signals to vary the lengths of the arms to produce the restoring force moments.

Figure 8:
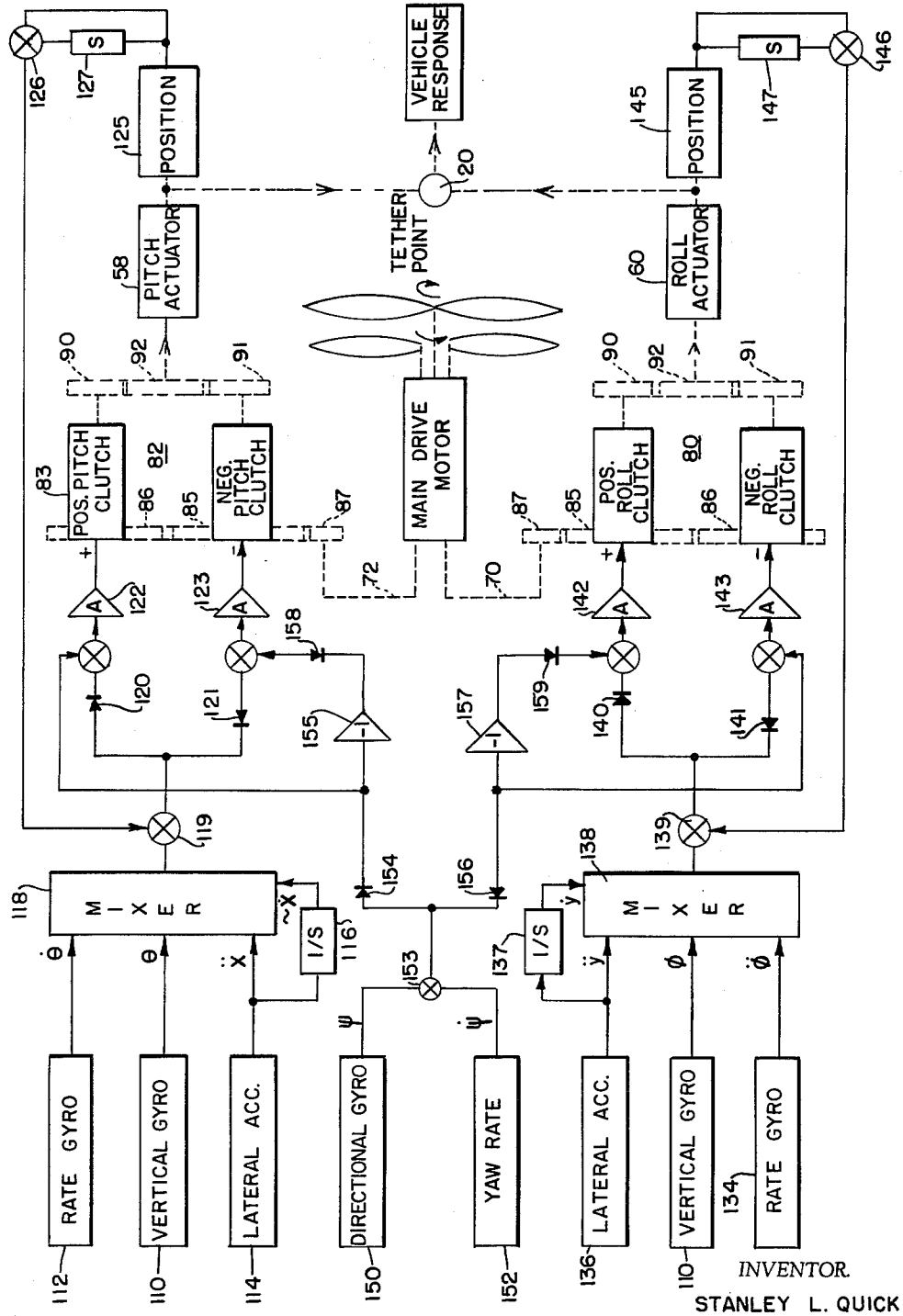
FIGURE 8 is a schematic diagram of the circuitry for producing the drive mechanism control signals.

FIGURE 8 is a schematic diagram of a preferred form of attitude sensing circuit for supplying signals to the two clutch assemblies 80 and 82 to control the motion of the respective actuator arms. The control package is divided into three portions for deriving pitch, yaw and roll control signals. The pitch control signal is derived in the following manner. A vertical gyro produces a signal ($\theta$) corresponding to the deviation of the helicopter from a horizontal plane in the longitudinal (pitch) direction. A rate gyro 112 produces a signal ($\dot{\theta}$) corresponding to the rate at which this pitch deviation takes place. An acceleration responsive transducer 114 measures the longitudinal component of the lateral acceleration ($\ddot{X}$) of the helicopter and a portion of this signal is integrated by an integrator circuit 116 to produce a lateral velocity signal ($\dot{X}$).

The signals from the respective elements 110, 112, 114 and 116 corresponding to deviations in pitch from normal flight are applied to a mixer circuit 118 whose output is a composite control signal of either positive or negative polarity and representing the direction, amount and rate of pitch correction to be applied to the vehicle to restore it to its normal flight condition. This control signal is applied through a combining circuit 119 to one of the clutch assemblies for shifting the tethering point to produce changes in the pitch attitude of the vehicle.

In the example being described, consider that the actuator arm 58 shifts the vehicle tether point to produce pitch correction so that the clutch assembly 82 comes into play. In this case the output signal from the mixer 118 is applied through the respective positive and negative signal steering diodes 120 and 121 to the inputs of respective clutch control signal amplifiers 122 and 123. Depending upon which amplifier has a signal applied thereto, either the clutch 83, which moves the tether point to tilt the fuselage up and is called the positive pitch clutch, or the clutch 84, which moves the tether point to tilt the vehicle down and is called the negative pitch clutch, is actuated to move a respective output gear 90 or 91. Actuation of the positive pitch clutch 83 moves the input drive gear 92 to shorten the actuator arm 58 and tilt the vehicle up, while actuation of the negative pitch clutch 84 lengthens the arm and tilts the vehicle down.

As explained before, movement of an actuator arm shifts the effective tether point and causes the helicopter to respond accordingly by changing its attitude. A change in aircraft attitude changes in turn the signals produced by the vertical gyro 110, rate gyro 112 and lateral acceleration responsive device 114. A position follow-up device 125 is connected to the pitch actuator arm 58 to smooth its response. The follow-up device is any type of a pickoff, such as a driven potentiometer, which produces an output signal corresponding to the position of the actuator arm. This output signal is applied both directly and through a rate circuit 127 to a combining circuit or adder 126. The combined output of circuit 126 is applied as a negative feedback signal back to combining circuit 119. The use of the position follow-up and the rate of change of the position follow-up signals prevents the pitch actuator arm from hunting. Adjustment of the length of the actuator arm 58 is continued until the output signal from combining circuit 119 is effectively zero and produces no further response. Mechanisms and drive systems of the type described above are well known in the aircraft autopilot art.

The shifting of the tether point to produce roll correction, i.e., correction 90° from the pitch axis, is accomplished in the following manner. The signals for controlling the clutch assembly 80, which has the positive and negative roll clutches, are produced and used in a manner similar to that described above. Here, a roll signal ($\phi$) corresponding to deviation from a horizontal plane is produced by another pickoff on the vertical gyro 110. This signal is combined in a mixer 138 with a roll rate signal ($\dot{\theta}$) produced by a rate gyro 134. The roll signal from gyro 110 is also combined with a lateral velocity signal ($\dot{Y}$) of the vehicle in the roll direction. The $\dot{Y}$ signal is produced by taking the $\ddot{Y}$ signal from transducer 136 and integrating it in circuit 137.

The composite signal at the output of the mixer 138 is applied through a combining circuit 139 and through the respective positive and negative steering diodes 140 and 141 to the inputs of clutch control signal amplifiers 142 and 143. These amplifiers actuate the positive and negative roll clutches in the clutch assembly 80 to vary the length of actuator arm 60. This arm shifts the tethering point 20 to produce roll correcting force moments since it is mounted at an angle of between 90° to 120° with respect to the pitch actuator arm 58. A position follow-up device 145, rate circuit 147 and combining circuit 146 are also provided to produce an anti-hunting signal for feedback to the combining circuit 139.

As the helicopter shifts from a normal flight condition, force moments are produced by roll or pitch changes which make the vehicle rotate or yaw around the rotor axis. This yawing is desirably eliminated since it may twist the cable 18 and also it detracts from the flight stability of the vehicle. Yaw deviation from a reference point is sensed by a directional gyro 150 and yaw rate by a suitable transducer 152 such as a rate gyro. The yaw direction and rate signals are combined in circuit 153 and applied to the pitch and roll clutch assemblies to produce what is effectively braking of one of the two rotors to obtain yaw control. The fuselage is at the same time carried along by the reaction to the braking torque in the same direction as the braked rotor. That is, the total angular momentum of the fuselage-rotor system is invariant, and if one rotor is slowed down, the fuselage will start to rotate to preserve momentum. Thus by varying the braking torque to a rotor a desired yaw control moment can be obtained to restore the vehicle to a predetermined reference location or to obtain any desired yaw.

In the present invention this is accomplished by actuating one or the other of the clutch assemblies. As described above, an output shaft connected to each rotor drives respective clutch assembly 80 or 82 through the belt and pulley drive elements 75, 76 and 87. As the clutches in an assembly are provided with larger magnitude control signals, the amount of torque that the controlled clutch takes from the connected driving shaft and rotor varies proportionately. The yaw of the vehicle is also in proportion to the torque absorbed by the clutch.

If only one clutch of an assembly is energized that clutch will produce both a yawing moment and a roll or pitch moment. In some cases it is desirable to provide only yaw correction so in order to accomplish this both the positive and negative clutches of an assembly are energized the same degree at the same time. When this is done power is absorbed by the driving shaft without causing a corresponding change in roll or pitch attitude since the counteracting motion of the output gears 90 and 91 cancel out the motion of the drive gear 92. Thus, controlled yawing motion in one direction or the other can be obtained with the counter-rotating shafts 70 and 72 by energizing the clutch pair of the proper clutch assembly with the same magnitude control signals. This will cause one of the rotor shafts to be braked with a consequent yawing motion in the direction of rotation of the braked rotor.

The yaw signal ($\psi$) is produced by a directional gyro 150 while the yaw rate ($\dot{\psi}$) signal is produced by a rate gyro 152. These two signals are combined in circuit 153 to produce a composite signal whose polarity and magnitude correspond to the direction and amount of yaw. The composite deviation signal corresponding to one direction of yaw, say a positive polarity signal, is applied from the combining circuit 153 through a steering diode 154 to the input of the positive pitch clutch amplifier 122. The signal at the output of diode 154 is also inverted by an amplifier 155 and applied through a negative poled steering diode 158 to the input of the negative pitch clutch amplifier 123. Thus, the two clutches 83 and 84 are energized by equal magnitude signals so their output torques are equal. This produces no rotation of the output gear 92 since the clutches are turning equal amounts but in opposite directions. However, power is absorbed from the shaft 72 to drive the two clutches 83 and 84 thereby causing the vehicle to yaw.

The deviation signal corresponding to the other direction of yaw, say a negative polarity signal, is used to control the clutches in assembly 80. The signal at the output of circuit 153 is applied through a negative steering diode 156 to the input of the negative roll clutch amplifier 143 and through an inverter amplifier 157 and positive poled steering diode 159 to the input of the positive roll clutch amplifier 142. Since the amplifier input signals are of equal magnitude no roll moment is produced. However, power is absorbed from shaft 70 to cause yawing of the craft in the direction opposite to that produced by the action of clutch assembly 82.

It should be clear that a simple manner of providing yaw correction has been provided. The yaw correction moments may also be produced at the same time that roll or pitch correcting moments, or both, are being produced. This is accomplished by providing equal magnitude yaw control signals to a pair of clutches to make them absorb power from the respectively connected shaft and at the same time providing one of the clutches of the pair with a roll or pitch correction signal. Stated another way, the average control signal level to both clutches of a pair is greater than for a roll or pitch correction only and the signals are of unequal amplitude. This is brought about by having the same amplitude signal applied to each clutch amplifier from the yaw control channel while at the same time adding a control signal from the roll or pitch channel for one of the amplifiers.

Figure 9:
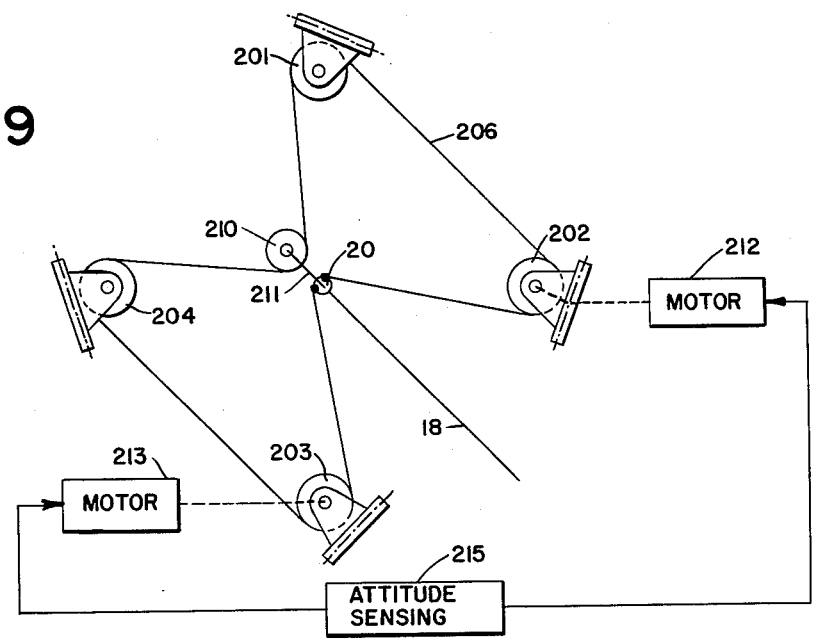
FIGURES 9 and 10 show other types of bridle arrangements for controllably shifting the tethering point.
Figure 10:
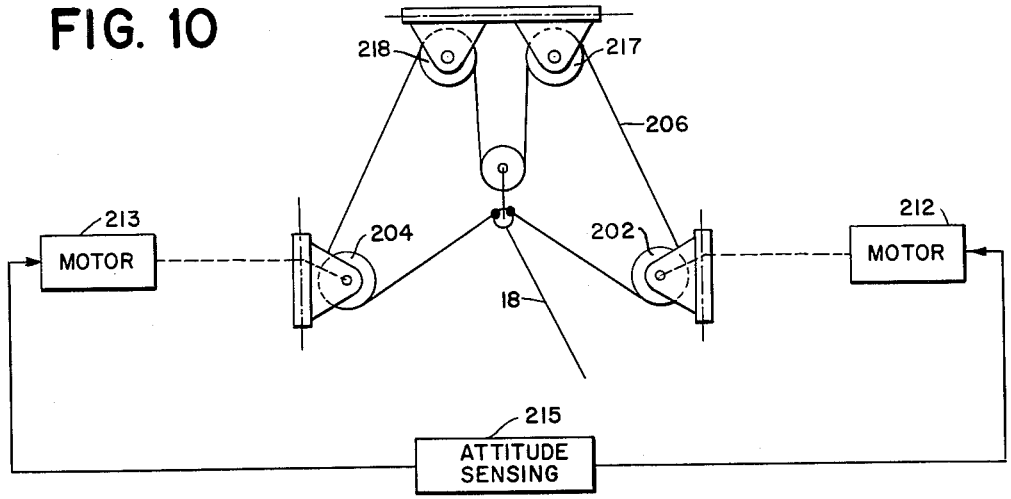

FIGURES 9 and 10 show other types of bridle arrangements for shifting the tethering point 20. In FIGURE 9 four rotatable pulleys 201, 202, 203 and 204 are spaced substantially 90° apart around the bottom of the fuselage. A single cable 206 is threaded through all of the pulleys and the tether cable 18 is attached thereto at point 20. A movable pulley 210 is connected to the tethering point 20 by a short link 211 and the two pulleys 202 and 203 are driven by the respective servomotors 212 and 213. These motors are under the control of the attitude sensing apparatus 215 which produces roll and pitch deviation signals. Rotation of one or the other pulleys 202 or 203 produces a differential tension in the cable 206 and a resultant shift of the location of the tethering point 20. The shift of tethering point 20 is effected in the proper direction and amount to produce the desired force correcting moment.

In FIGURE 10 a three-point bridle system is shown with pulleys located at three points spaced 120° apart around the helicopter fuselage. Here again pulleys 202 and 204 are driven by servomotors 212 and 213 to exert a differential tension on bridle cable 206. This cable is threaded through the two pulleys 202 and 204 and through a set of pulleys 217–218. The operation of the system is the same as in FIGURE 9 in which the tether point 20 is shifted by applying control signals to the two motors to produce a differential tension on cable 206.

It should be understood that other forms of cable type bridle arrangements, analogous to those shown in FIGURES 4, 9 and 10 may be utilized. Also, other equivalent mechanical structures, such as tracks, may be used to guide the tether point motion. Further, other suitable mechanical arrangements may be used to physically tilt the helicopter fuselage in the same manner performed by the ball and nut mechanism of FIGURES 5–7. It should be understood that the clutch assembly power pick off shown in FIGURES 5–7 provides a simple way for obtaining yaw control. If yaw control is not needed or is to be performed by some other arrangement, then the clutch assembly can be replaced by any suitable motor-driven actuator to move the two actuator arms.

Therefore it has been seen that a novel helicopter has been provided which is tethered by a single cable. The control of the cable length at the base station eliminates the need for collective pitch control while the controlled shifting of the tethering point to produce moments to physically tilt the rotor axis eliminates the need for cyclic pitch control. This gives rise to a helicopter vehicle which is both simple in construction and stable in its flight characteristics.

In the following claims the terms "tether point" and "effective tether point" are used interchangeably to account for cases where the tether point is shifted with respect to the vehicle's center of gravity or vice versa.

Although a particular structure has been described, it should be understood that the invention should not be limited to the particular embodiments of the invention shown by way of illustration, but rather to the scope of the invention covered by the appended claims.

What is claimed is:

1. A helicopter vehicle tethered by a single cable on which a force is produced when said vehicle is in flight comprising a tethering point on said vehicle, means for connecting said cable to said tethering point, and means for controllably shifting the tethering point of said vehicle with respect to both transverse major axes of the vehicle to cause the force on said cable to produce force moments on said vehicle.

2. A helicopter vehicle tethered by a single cable on which a force is produced when said vehicle is in flight comprising tethering point means on said vehicle to which said cable is connected, and power driven means for controllably shifting the tethering point means with respect to other portions of the vehicle in a predetermined manner with respect to both transverse major axes of the vehicle for producing force moments on said vehicle in response to the force on said cable.

3. A helicopter vehicle tethered by a single cable on which a force is produced when said vehicle is in flight comprising means for connecting said cable to a tethering point on said vehicle, means on said vehicle for sensing deviations of said helicopter from a predetermined flight attitude and producing control signals representative thereof, and means responsive to said control signals for controllably shifting the effective tethering point with respect to the helicopter center of gravity and both major transverse axes of the helicopter to cause the force on said cable to produce force moments about the helicopter center of gravity which tend to restore the helicopter to said predetermined flight attitude.

4. A helicopter vehicle tethered by a single cable on which a force is produced when said vehicle is in flight comprising tethering point means on said vehicle to which said cable is connected, said tethering point means and said vehicle having a predetermined positional relationship with respect to each other when said vehicle is in a predetermined flight attitude, means for sensing the deviation of said vehicle from said predetermined flight attitude and producing control signals representative thereof, and means responsive to said control signals for controllably shifting the tethering point means with respect to other portions of the vehicle in a predetermined manner with respect to both transverse major axes of the vehicle to cause the force on said cable to produce force components for restoring the vehicle to said predetermined flight attitude.

5. A helicopter tethered by a single cable operated from a base station comprising means for connecting said cable at a single point on said vehicle, power means on said vehicle for lifting the same vertically thereby producing a force on said cable, and means for controllably shifting the location of the single connecting point on said vehicle with respect to other parts of said vehicle and about both major transverse axes of the vehicle to thereby produce varying force moments to react on said vehicle due to the force on said cable.

6. A helicopter tethered by a single cable operated from a base station comprising means for connecting said cable at a single point on said vehicle, power means on said vehicle for lifting the same vertically thereby producing a force on said cable, means for sensing the deviation of the vehicle from a predetermined orientational flight attitude and for producing control signals representative thereof, and means responsive to said control signals for controllably shifting the location of the single connecting point on said vehicle with respect to other parts of said vehicle and about both major transverse axes of the vehicle to thereby produce varying force moments to react on said vehicle due to the force on said cable.

7. A helicopter vehicle tethered by a single cable on which a force is produced when said vehicle is in flight comprising tethering point means on said vehicle to which said cable is connected, said tethering point means and said vehicle having a predetermined positional relationship with respect to each other when said vehicle is in a predetermined flight attitude, means for sensing the deviation of said vehicle from said predetermined flight attitude and producing control signals representative thereof, a pair of variable length actuator arms, means for connecting one end of each of said actuator arms to said tethering point means and the other end of each said arm to a different point on said vehicle, and means responsive to said control signals for varying the lengths of said arms to shift the positional relationship between said tethering point means and said vehicle in a predetermined manner whereby the force on said cable produces force moments on said vehicle acting about both major transverse axes in a manner tending to restore said vehicle to said predetermined flight attitude.

8. A helicopter vehicle tethered by a single cable on which a force is produced when said vehicle is in flight comprising tethering point means on said vehicle to which said cable is connected, said tethering point means and said vehicle having a predetermined positional relationship with respect to each other when said vehicle is in a predetermined flight attitude, means for sensing the deviation of said vehicle from said predetermined flight attitude and producing control signals representative thereof, a pair of variable length actuator arms, means for connecting one end of each of said actuator arms to said tethering point means and the other ends of said arms to points on said vehicle spaced respectively approximately 90° to 120° apart around an axis thereof, and means responsive to said control signals for controllably varying the lengths of said arms to shift the positional relationship between said tethering point means and said vehicle in a predetermined manner to cause the force on said cable to produce force moments on said vehicle acting to restore said vehicle to its predetermined flight attitude.

9. A helicopter vehicle tethered by a single cable on which a force is produced when said vehicle is in flight comprising tethering point means on said vehicle to which said cable is connected, said tethering point means and said vehicle having a predetermined positional relationship with respect to each other when said vehicle is in a predetermined flight attitude, means for sensing the deviation of said vehicle from said predetermined flight attitude and producing control signals representative thereof, a bridle mounted on said vehicle, means for fixedly attaching said tethering point means to a point on said bridle, and means responsive to said control signal for moving said bridle in a predetermined manner with respect to both transverse major axis of the vehicle thereby shifting the attachment point with respect to said vehicle and producing force components thereon due to the force on said cable acting on said vehicle.

10. A helicopter vehicle as set forth in claim 9 wherein said bridle is formed by a continuous cable wound over a plurality of pulleys which are attached to points on said vehicle, and said means for moving the bridle includes power driven means for turning selected ones of said pulleys.

11. A helicopter vehicle as set forth in claim 10 wherein three pulleys are provided which are spaced substantially 120° apart around an axis of said vehicle.

12. A helicopter vehicle as set forth in claim 10 wherein four pulleys are provided which are spaced substantially 90° apart around an axis of said vehicle.

13. In a helicopter vehicle having a force component acting thereon which tends to lift the vehicle, said vehicle being tethered at a single point displaced vertically from the center of gravity of the vehicle to a base station by cable means having a tension force component of generally opposite direction to the lifting force component acting thereon the combination comprising rotor means on said vehicle for producing the lifting force and tension force components, and means for controllably shifting the position of said tether point in a predetermined direction with respect to both major transverse axes of the vehicle and the vehicle center of gravity to react with the tension force acting on the cable means to shift the position of said rotor means.

14. In a helicopter vehicle having a force component acting thereon which tends to lift the vehicle, said vehicle being tethered at a single point displaced vertically from the center of gravity of the vehicle to a base station by cable means having a tension force component of generally opposite direction to the lifting force component acting thereon the combination comprising rotor means on said vehicle for producing the lifting force and tension force components, means for sensing the deviation of said rotor means from a predetermined position, and means responsive to said sensing means for controllably shifting the position of the tether point with respect to both major transverse axes of the vehicle and the cented of gravity of the vehicle in a direction to react with the tension force acting on the cable means to produce force components through said center of gravity for shifting said rotor means toward said predetermined position.

15. In a vehicle having a force component acting thereon which tends to lift the vehicle, said vehicle adapted to be tethered to a base station by cable means having a force component acting thereon in a direction generally opposite to the force component lifting the vehicle comprising rotor means on said vehicle for producing the lifting force component, means for connecting said cable means to a first point on said vehicle, variable position means connected to said first point, and means for controlling said variable means to controllably shift the position of said rotor means with respect to said connecting means in a predetermined direction with respect to both major transverse axes of the vehicle thereby causing the force on said cable means to react with said vehicle to produce force components which tend to shift the position of said rotor means.

16. In a vehicle having a force component acting thereon which tends to lift the vehicle, said vehicle adapted to be tethered to a base station by cable means having a force component acting thereon in a direction generally opposite to the force component lifting the vehicle comprising rotor means on said vehicle for producing the lifting force component, means for connecting said cable means to a first point on said vehicle, a pair of variable length actuator arms, means for connecting one end of each of said arms to said first point and the other ends to respective fixed points on said vehicle which are spaced in the range from substantially 90° to 120° apart with respect to the axis of the rotor means, and means for controllably varying the lengths of said arms to shift the position of said rotor means with respect to said connecting means thereby causing the force on said cable means to react with the vehicle to produce force components which tend to shift the position of said rotor means.

17. In a vehicle having a force component acting thereon which tends to lift the vehicle, said vehicle adapted to be tethered to a base station by cable means having a force component acting thereon in a direction generally opposite to the force component lifting the vehicle comprising rotor means on said vehicle for producing the lifting force component, means for connecting said cable means to a first point on said vehicle, a pair of variable length arms, one end of each of said arms connected to said first point and the other ends connected to fixed points on said vehicle which are spaced in the range from substantially 90° to 120° from each other with respect to said first point, means for sensing the deviation of the rotor means from a predetermined position and producing signals representative thereof, and means responsive to said signals for controllably varying the lengths of said arms to shift the position of the connecting means in a direction opposite to the direction of deviation of the rotor means from the predetermined reference position, the force on the cable thereby producing force components on said vehicle which tend to restore the rotor means to said predetermined position.

18. A helicopter vehicle as set forth in claim 14 wherein said tether point shifting means operates on two axes of the vehicle which are displaced substantially 90° from each other.

References Cited by the Examiner
UNITED STATES PATENTS 2,453,857 11/1948 Platt et al. _____ 244—17.17
2,886,261 5/1959 Robert et al. _____ 244—17.25

FOREIGN PATENTS 897,756 5/1962 Great Britain.

MILTON BUCHLER, *Primary Examiner.*

FERGUS S. MIDDLETON, *Examiner.*